United States Patent
Silverstein et al.

(10) Patent No.: US 11,074,415 B2
(45) Date of Patent: Jul. 27, 2021

(54) CONTEXT-SENSITIVE AGGREGATION OF CHATBOT CONVERSATIONS

(71) Applicant: International Business Machines Corporation, Armonk, NY (US)

(72) Inventors: Zachary A. Silverstein, Austin, TX (US); Robert H. Grant, Atlanta, GA (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 16/405,030

(22) Filed: May 7, 2019

(65) Prior Publication Data

US 2020/0356630 A1    Nov. 12, 2020

(51) Int. Cl.
    *G06F 40/30*    (2020.01)
    *H04L 12/58*    (2006.01)
    *G06F 16/332*    (2019.01)

(52) U.S. Cl.
    CPC .......... *G06F 40/30* (2020.01); *G06F 16/3329* (2019.01); *H04L 51/02* (2013.01); *H04L 51/04* (2013.01); *H04L 51/32* (2013.01)

(58) Field of Classification Search
    CPC ................................ H04L 51/02; G06F 40/30
    See application file for complete search history.

(56) References Cited

U.S. PATENT DOCUMENTS

| 7,769,705 B1 | 8/2010 | Luechtefeld |
| 8,539,359 B2 | 9/2013 | Rapaport et al. |
| 9,479,931 B2 | 10/2016 | Ortiz, Jr. et al. |
| 10,079,013 B2 | 9/2018 | Kalns et al. |

(Continued)

FOREIGN PATENT DOCUMENTS

WO    2010142163 A1    12/2010

OTHER PUBLICATIONS

"Chatbot Market Size to Reach $1.25 Billion by 2025 | CAGR: 24.3%." GrandViewResearch.com. Aug. 2017. Retrieved on Dec. 17, 2018 from https://www.grandviewresearch.com/press-release/global-chatbotmarket, 6 pages.

(Continued)

*Primary Examiner* — Jialong He
(74) *Attorney, Agent, or Firm* — William H. Hartwell; Maxine L. Barasch; Keohane & D'Alessandro, PLLC

(57) ABSTRACT

Disclosed embodiments provide techniques for expanding user-chatbot conversations to include other relevant users. In some embodiments, the users are deemed to potentially be interested in learning information regarding the conversation topic. In other embodiments, the users are deemed to be potentially able to provide additional information regarding the conversation topic. In embodiments, a submitted question to a chatbot in a conversation on a messaging platform is received. The topic of the submitted question is identified. A probability that one or more additional users would benefit from an answer to the submitted question is determined. One or more additional users are invited to the conversation based on the determined probability that one or more additional users would benefit from an answer to, and/or provide information regarding, the submitted question.

17 Claims, 15 Drawing Sheets

(56) References Cited

U.S. PATENT DOCUMENTS

| | | | | |
|---|---|---|---|---|
| 2002/0055973 | A1* | 5/2002 | Low | H04L 12/1822 709/204 |
| 2010/0070554 | A1* | 3/2010 | Richardson | G06Q 10/06 709/202 |
| 2010/0268681 | A1* | 10/2010 | Guo | G06Q 10/10 706/54 |
| 2011/0141919 | A1* | 6/2011 | Singh | H04L 41/0681 370/252 |
| 2012/0030301 | A1* | 2/2012 | Herold | H04L 12/1818 709/206 |
| 2014/0207882 | A1* | 7/2014 | Joo | H04L 51/02 709/206 |
| 2015/0186156 | A1* | 7/2015 | Brown | G06F 9/453 715/706 |
| 2016/0099892 | A1* | 4/2016 | Palakovich | H04L 51/02 709/206 |
| 2016/0110422 | A1* | 4/2016 | Roytman | G06N 5/00 706/12 |
| 2018/0025726 | A1 | 1/2018 | Gatti de Bayser et al. | |
| 2019/0140986 | A1* | 5/2019 | Anderson | G10L 15/1822 |

OTHER PUBLICATIONS

Murphy, Jim; Phifer, Gene; Tay, Gavin; Lowndes, Mike. "Magic Quadrant for Digital Experience Platforms." Gartner. Jan. 17, 2018. Retrieved on Dec 17, 2018 from https://www.gartner.com/doc/reprints?id=1-4LPO0SU&ct=171206&st=sb, 39 pages.

* cited by examiner

CONTEXT-SENSITIVE AGGREGATION OF CHATBOT CONVERSATIONS

FIELD

Embodiments relate to context-sensitive aggregation of chatbot conversations.

BACKGROUND

Chatbots are used today for providing help with software programs, websites, and many other things. Sometimes a person has the same or a similar question to another person. Both people investigating an answer separately is inefficient in that it creates redundancy and unnecessary use of resources. Sometimes, a person knows the answer to a question of another user, but is unaware that the other user has such a question. This is inefficient as well since the user with the question must investigate on his/her own to find an answer which has previously been investigated by, and is already known to, the other user. Accordingly, there exists a need for improvements in chatbot technologies.

SUMMARY

In one embodiment, there is provided a computer-implemented method for context-sensitive chatbot aggregation in a messaging platform comprising: receiving a submitted question to a chatbot in a conversation on the messaging platform; identifying a topic of the submitted question; determining a probability that one or more additional users would benefit from an answer to the submitted question; and inviting one or more additional users to the conversation based on the determined probability that one or more additional users would benefit from an answer to the submitted question.

In another embodiment, there is provided an electronic computation device comprising: a processor; a memory coupled to the processor, the memory containing instructions, that when executed by the processor, perform the process of: receiving a submitted question to a chatbot in a conversation on a messaging platform; identifying a topic of the submitted question; determining a probability that one or more additional users would benefit from an answer to the submitted question; and inviting one or more additional users to the conversation based on the determined probability that one or more additional users would benefit from an answer to the submitted question.

In yet another embodiment, there is provided a computer program product for an electronic computation device comprising a computer readable storage medium having program instructions embodied therewith, the program instructions executable by a processor to cause the electronic computation device to perform the process of: receiving a submitted question to a chatbot in a conversation on a messaging platform; identifying a topic of the submitted question; determining a probability that one or more additional users would benefit from an answer to the submitted question; and inviting one or more additional users to the conversation based on the determined probability that one or more additional users would benefit from an answer to the submitted question.

BRIEF DESCRIPTION OF THE DRAWINGS

Features of the disclosed embodiments will be more readily understood from the following detailed description of the various aspects of the invention taken in conjunction with the accompanying drawings.

Figure 1:
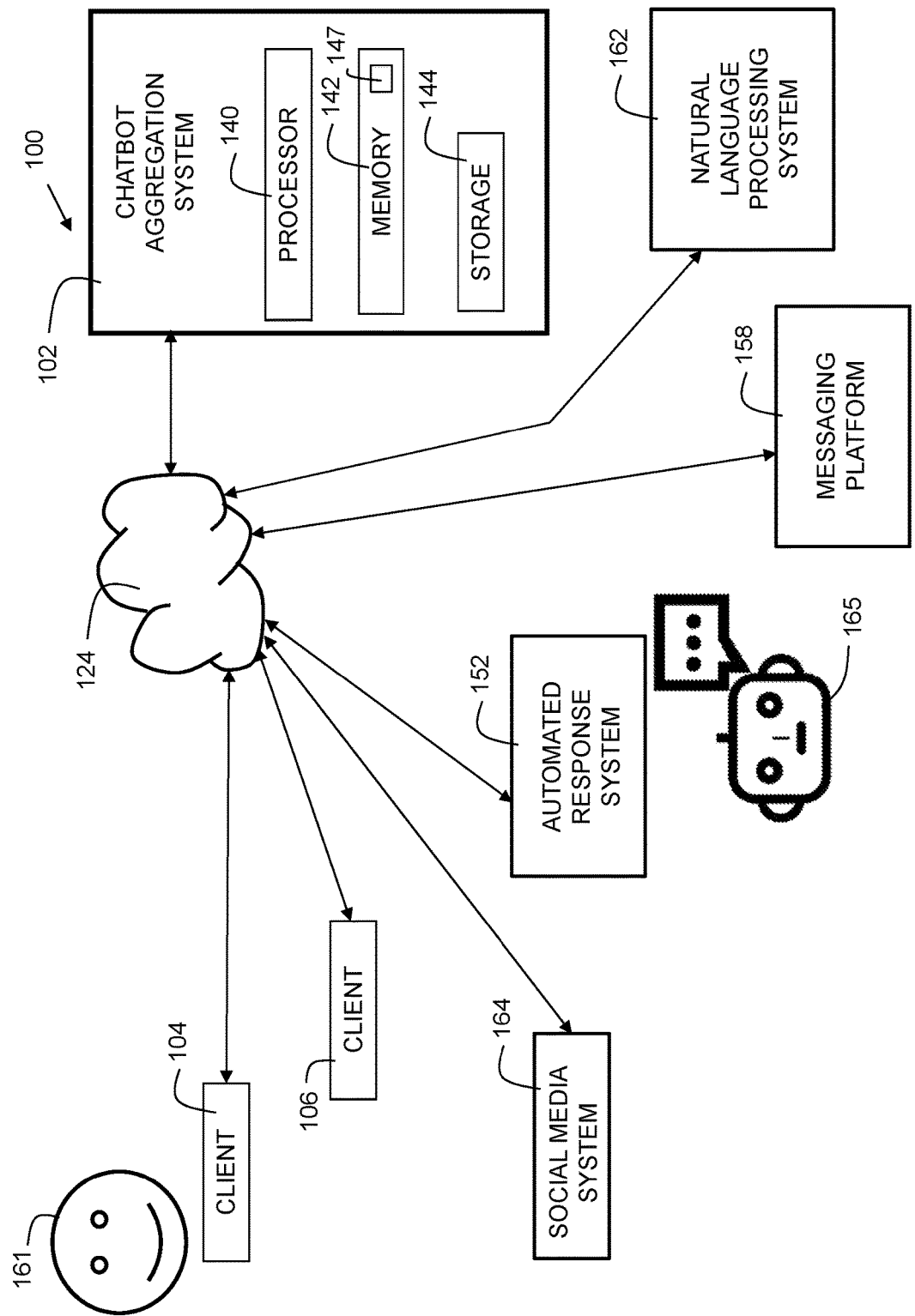
FIG. 1 is an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Disclosed embodiments provide techniques for expanding user chatbot conversations to include other relevant users. In some embodiments, the users are deemed to potentially be interested in learning information regarding the conversation topic. In some embodiments, the users are deemed to be potentially able to provide additional information regarding the conversation topic. In embodiments, a submitted question to a chatbot in a conversation on a messaging platform is received. The topic of the submitted question is identified. A probability that one or more additional users would benefit from, or be able to provide information about, an answer to the submitted question is determined. One or more additional users are invited to the conversation based on the determined probability that one or more additional users would benefit from an answer to, and/or provide information regarding, the submitted question.

FIG. 1 is a diagram 100 for an environment of embodiments of the present invention. A chatbot aggregation system 102 may include a processor 140, memory 142, and storage 144. The processor 140 is coupled to the memory 142 such that it can access instructions 147 stored in memory 142. The processor 140 executes the instructions 147, stored in memory 142, in implementation of embodiments of the present invention. Memory 142 may include dynamic random-access memory (DRAM), static random-access memory (SRAM), magnetic storage, and/or a read only memory such as flash, EEPROM, optical storage, or other suitable memory. In some embodiments, the memory 142 may not be a transitory signal per se. The storage 144 may include one or more hard disks, or other suitable storage technology. The chatbot aggregation system 102 is connected to network 124. Network 124 is the Internet, a wide area network, a local area network, or any other suitable network. System 102 is an electronic computation device. Note that while one such device is illustrated in diagram 100, in practice, there may be multiple electronic computing devices operating in a distributed manner for load balancing and data redundancy.

Client devices 104 and 106 are also connected to network 124. Client devices are each operated by a person (e.g., client device 104 belongs to live user 161). Each of the client devices is a smartphone, smartwatch, tablet computer, laptop computer, or any other suitable communication device now known or hereafter developed. The client devices may have Bluetooth®, Wi-Fi, or other suitable communication interface to communicate over network 124. The client devices may have a global positioning system (GPS) or another geolocation receiver for determining location (e.g., of the user 161). Client devices 104 and 106 may include, or be connected to, a microphone for capturing user speech.

Automated response system 152 is also connected to network 124. System 152 is a computing device, which implements a chatbot (referred to herein interchangeably as a "virtual assistant"), represented here at 165. The chatbot is an entity created by system 152. It is what the user 161 is "talking to" when interacting with system 152. The chatbot simulates a human at the other end of a conversation. In some embodiments, the functionality of the automated response system 152 may be provided by the chatbot aggregation system 102.

The automated response system 152 is driven by artificial intelligence (AI), heuristics, natural language processing, and/or machine learning. In some embodiments, a user may be able to speak to the chatbot, and the speech is converted to text. The text is then analyzed for content, such that the chatbot can respond to the live user.

Also in communication with network 124 is social media system 164. Social media system 164 is a platform on which various users can initiate accounts in which he/she can post text, images, videos, etc. The user 161 may connect its account with others in the system 164 by "friending," "linking," etc. The postings of other connected users (and sometimes the user, e.g., 161 him/herself) are shown in a feed in the account of user 161.

Also in communication with network 124 is messaging platform 158, on which users can communicate. Messaging platform may be text-based, allowing users to send and receive messages in text form. The platform may allow image, video, and audio file transmission as well. In some embodiments, audio of user speech captured into a microphone is converted to text. In some embodiments, the platform 158 may allow live audio or video communication/conferencing. In some embodiments, the messaging platform may be included within a social media system 164.

Also in communication with network 124 is natural language processing (NLP) system 162. NLP system 162 analyzes human communication, and with a sufficient sample of text (e.g., 300 words or so) can infer or detect user characteristics such as age, gender, education level and/or others. Natural language processing techniques such as disambiguation analysis, dispersion analysis, bigram analysis, and others can be performed on transcripts, logs, text, social media posts, audio speech, etc. Inferences developed based on the natural language processing may be used as criteria on which to base a determination of which users are candidates for invitation to a conversation. In some embodiments, the functionality of the NLP system 162 may be provided by the chatbot aggregation system 102 and/or the automated response system 152.

Chatbot aggregation system 102 can scrape information from social networking system 164, messaging platform 158, etc., to collect data on topics the user may know about, or topics that may be of interest to the user. Data relating to past communications is useful not just in the content that can be obtained, but also in determining how people are connected. It can be determined whether two users are friends, belong to a same club, work for the same company, etc. For example, in some cases, a chat initiator (person submitting the question to the chatbot) may prefer that the chatbot invite, to join (aggregate) conversations, people with whom s/he has previously communicated, but may still be willing to accept help or share information with people s/he does not know if the candidate invitee user works for the same company as the initiator.

Figure 2:
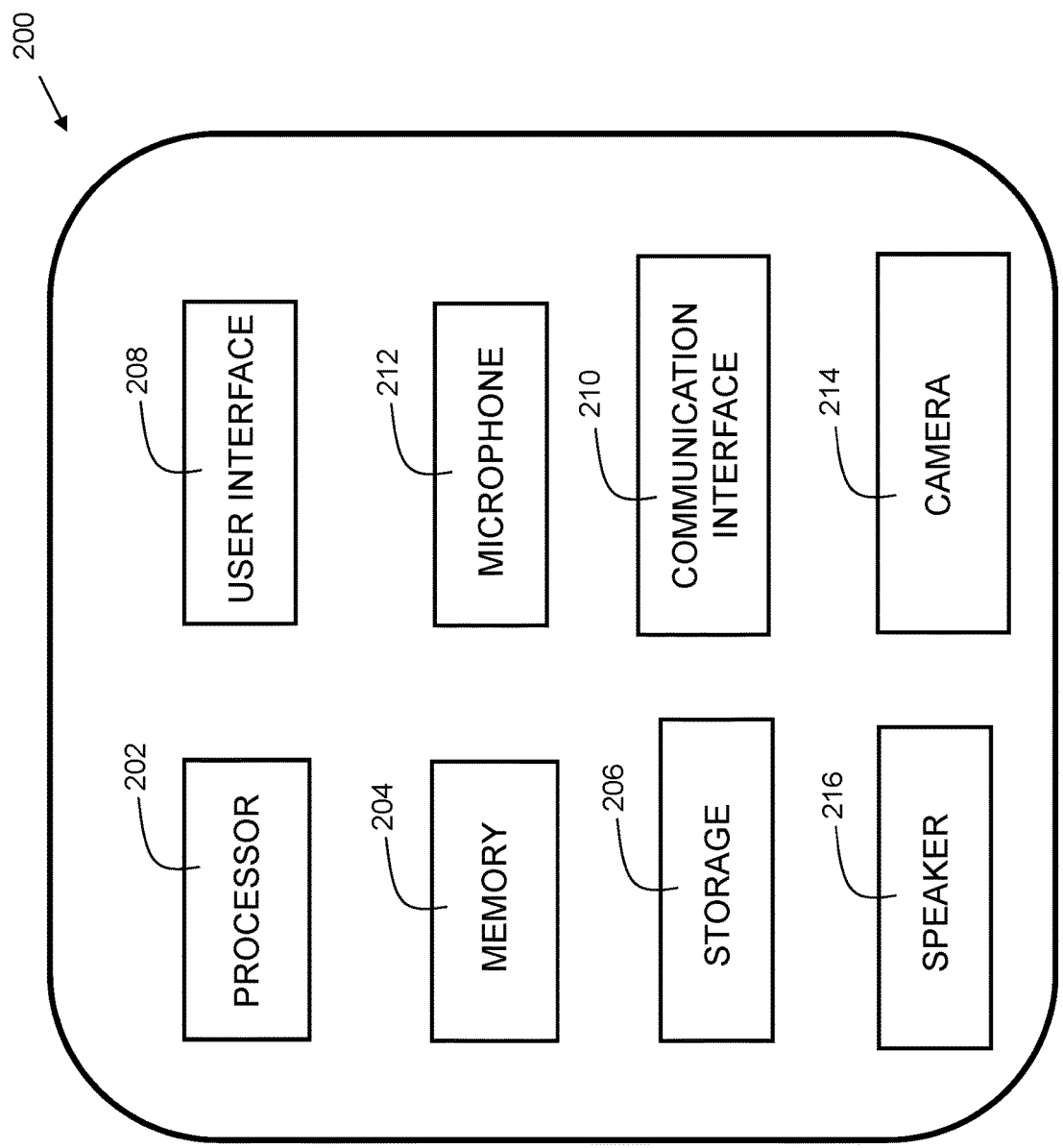
FIG. 2 is a block diagram of a client device used with embodiments of the present invention.

FIG. 2 shows a block diagram of an electronic device used with embodiments of the present invention. Device 200 is a smartphone, tablet computer, or other computing device. Device 200 includes a processor 202, which is coupled to a memory 204. Memory 204 may include dynamic random-access memory (DRAM), static random-access memory (SRAM), magnetic storage, and/or a read only memory such as flash, EEPROM, optical storage, or other suitable memory. In some embodiments, the memory 204 may not be a transitory signal per se.

Device 200 may further include storage 206. In embodiments, storage 206 may include one or more magnetic storage devices such as hard disk drives (HDDs). Storage 206 may additionally include one or more solid state drives (SSDs).

Device 200 further includes user interface 208. This may be a display, such as an LED display, a touch-sensitive screen, a keyboard, a mouse, or any other suitable interface for a user to interact with device 200.

The device 200 further includes a communication interface 210. The communication interface 210 may be a wired communication interface that includes Ethernet, Gigabit Ethernet, or the like. In embodiments, the communication interface 210 may include a wireless communication interface that includes modulators, demodulators, and antennas for a variety of wireless protocols including, but not limited to, Bluetooth™, Wi-Fi, and/or cellular communication protocols for communication over a computer network.

Device 200 may further include a microphone 212 for capturing user utterances and speech. The microphone may be integral with the device 200 as shown, or connected thereto via a wired or wireless connection.

Device 200 may further include camera 214. The camera may be integral with the device 200 as shown, or connected thereto via a wired or wireless connection. Device 200 may further include a speaker 216, which may be powered or passive.

Figure 3:
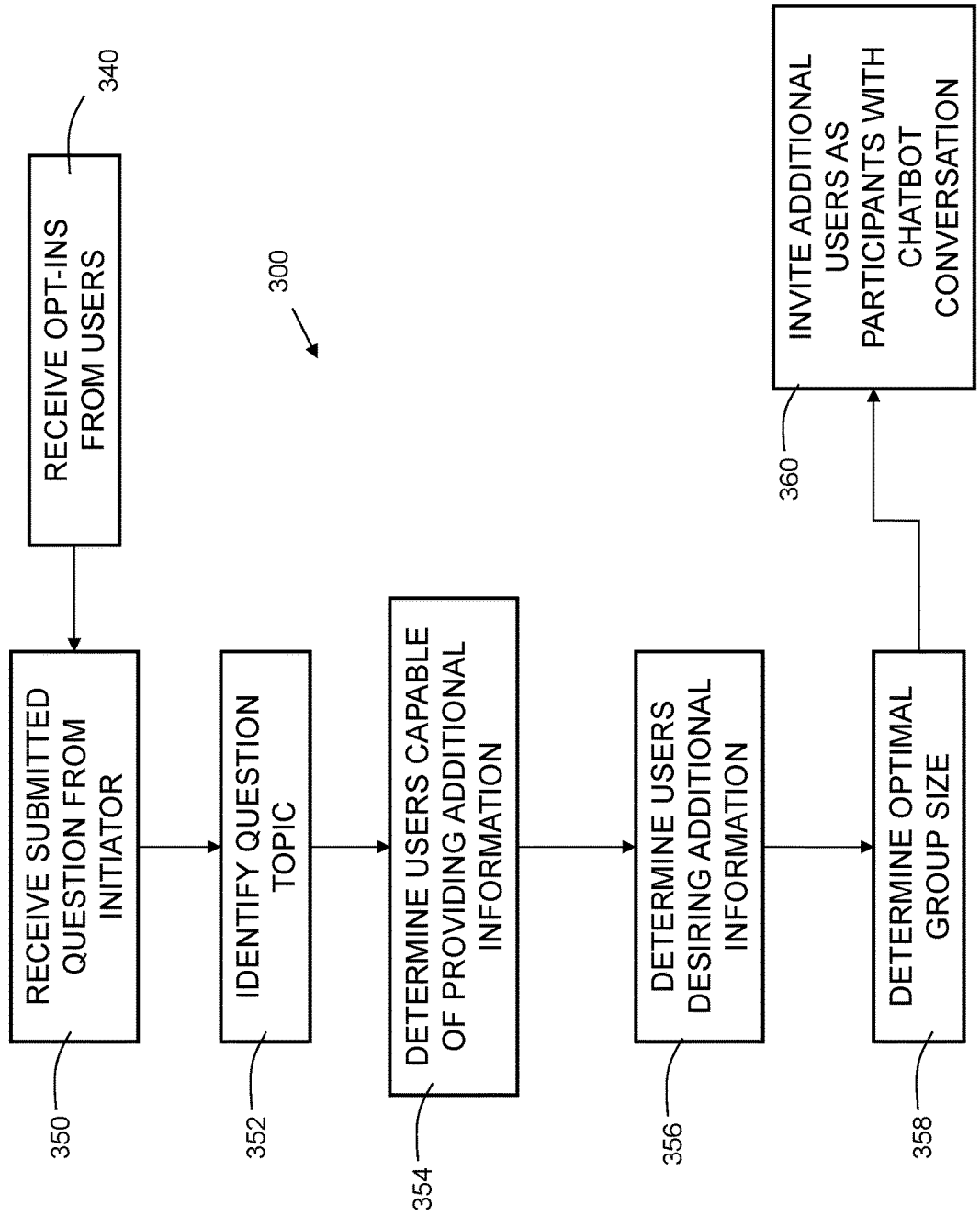
FIG. 3 is a flowchart indicating process steps for embodiments of the present invention.

FIG. 3 is a flowchart 300 indicating process steps for embodiments of the present invention. In some embodiments, at 340, in order for a user to be considered for candidacy to be joined (aggregated) to a conversation, s/he must opt in. This is an optional step. Embodiments can receive an opt-in notification from a user via a check in a check box, a selection of a radio button, or using a drop-down menu on a user interface (via finger tap on a responsive screen, or a mouse click, etc.). Opting in serves as permission for embodiments to scrape and collect data on that user, as well as message that user. In some embodiments, permissions may be set separately for each of such actions.

At 350, a submitted question to the chatbot is received from an initiator. The question may be submitted to the automated response system 152 by the user 161 via client device 104 (FIG. 1).

At 352, a topic context (root topic) of the question is identified. Root topics are determined via known entity recognition. A root topic of a conversation can be captured at a generic or specific level, depending on the amount of data in the question. A named entity capture model can be trained on a bulk of text. An artificial intelligence and natural language processing system, such as Watson Discovery (of International Business Machines), can be used to perform this analysis.

At 354, it is determined which users are capable of providing additional information. Embodiments can include determining whether one or more additional users have information regarding the topic of the submitted question. (One or more additional users are invited to the conversation based on probability determination that one or more additional users have information regarding the topic of the submitted question.) The determination may be performed by analyzing data scraped from social media systems (such as 164 of FIG. 1), messaging platforms (such as 158 of FIG. 1), enterprise intranet profiles, etc.

At 356, it is determined which users are desiring additional information. Embodiments can include determining a probability that one or more additional users would benefit from an answer to the submitted question (one or more additional users are invited to the conversation based on a determination that one or more additional users would benefit from an answer to the submitted question). To make the determination, an analysis is performed. In some embodiments, this involves establishing scores for topics as in the table below, indicative of a probability that other users should be engaged.

| Root topic keyword | Summary | Score |
| --- | --- | --- |
| Taxes | Almost always confidential, all requests to bring in another party are marked sensitive | −0.7 |
| Compensation | Usually at least one other person is involved (at least HR representative and/or supervisor); accordingly, such other person may be a candidate for joining to a conversation | 0.2 |
| Team Dinner | Always openly discussed with multiple people | 0.9 |

In this example, the more positive the score, the more probable an additional person should be joined to a conversation. The more negative the score, the less probable an additional person should be joined to the conversation.

At 358, optimal group size is determined for the conversation. The determination may be based on the probability that one or more additional users have information regarding the topic of the submitted question. Alternatively, or in addition, the determination may be based on the probability that one or more additional users would benefit from an answer to the submitted question. Other factors that can affect the optimal group size computation include scroll back analysis (how often and/or how much a user needs to scroll backwards on a chatlog to see previous comments), and repeat question analysis (how often a user needs to re-ask or restate a question).

At 360, additional users are invited as participants with the chatbot conversation. A current group size for the conversation can be determined, where the current group comprises one or more current users. One or more additional users are invited to join to the conversation based on the determined optimal group size and the determined current group size. In some embodiments, only one of steps 354 and 356 are included in the process.

Figure 4:
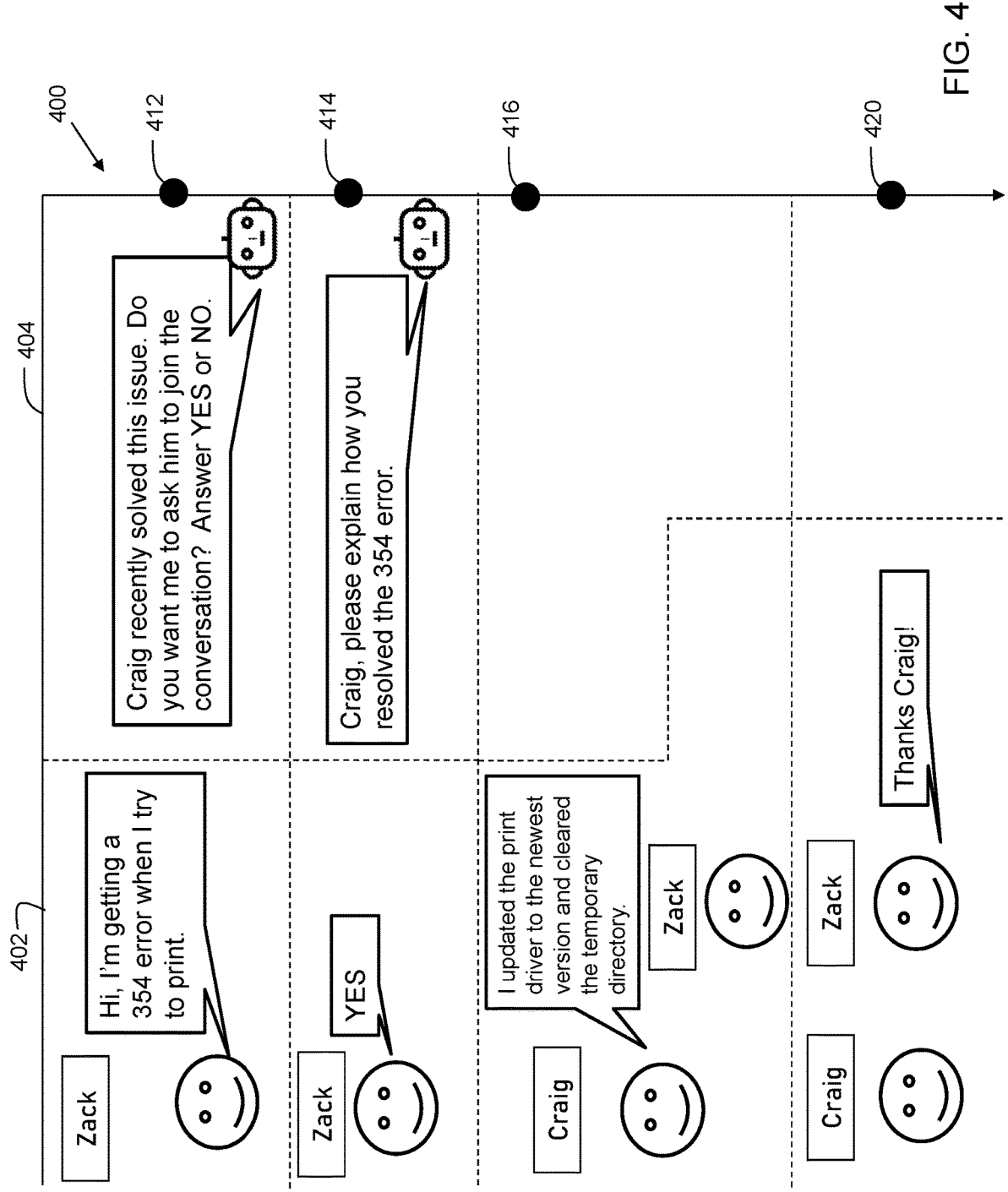
FIG. 4 is an example of a chatbot conversation inviting a user that has information regarding the topic of the submitted question.

FIG. 4 is an example 400 of a chatbot conversation inviting a user that has been determined likely to have information regarding the topic of the submitted question. The chatbot is an automated response entity (such as 152 of FIG. 1) for interaction with a live user. User (human) communications are shown in column 402, and chatbot actions are shown in column 404. In column 402, row 412, user, Zack, says "Hi, I'm getting a 354 error when I try to print." In column 404, row 412, the chatbot responds, "Craig recently solved this issue. Do you want me to ask him to join the conversation? Answer YES or NO." In column 402, row 414, Zack replies, "YES." Craig is then joined to the conversation (as shown in column 404, rows 416 and 420. In column 404, row 414, the chatbot says, "Craig, please explain how you resolved the 354 error." In column 402, row 416, Craig says, "I updated the print driver to the newest version and cleared the temporary directory." In column 402, row 420, Zack responds, "Thanks Craig!" Zack's response at column 402, row 420 may be recorded by embodiments (e.g., system 102 of FIG. 1) as an indication of a successful resolution, which can serve to reinforce Craig's ranking as a subject matter expert on the topic of the initiator question (in this example, a "354 error"). In this way, over time, the system 102 can identify subject matter experts based on successful resolutions of questions posed in the messaging platform.

Figure 5:
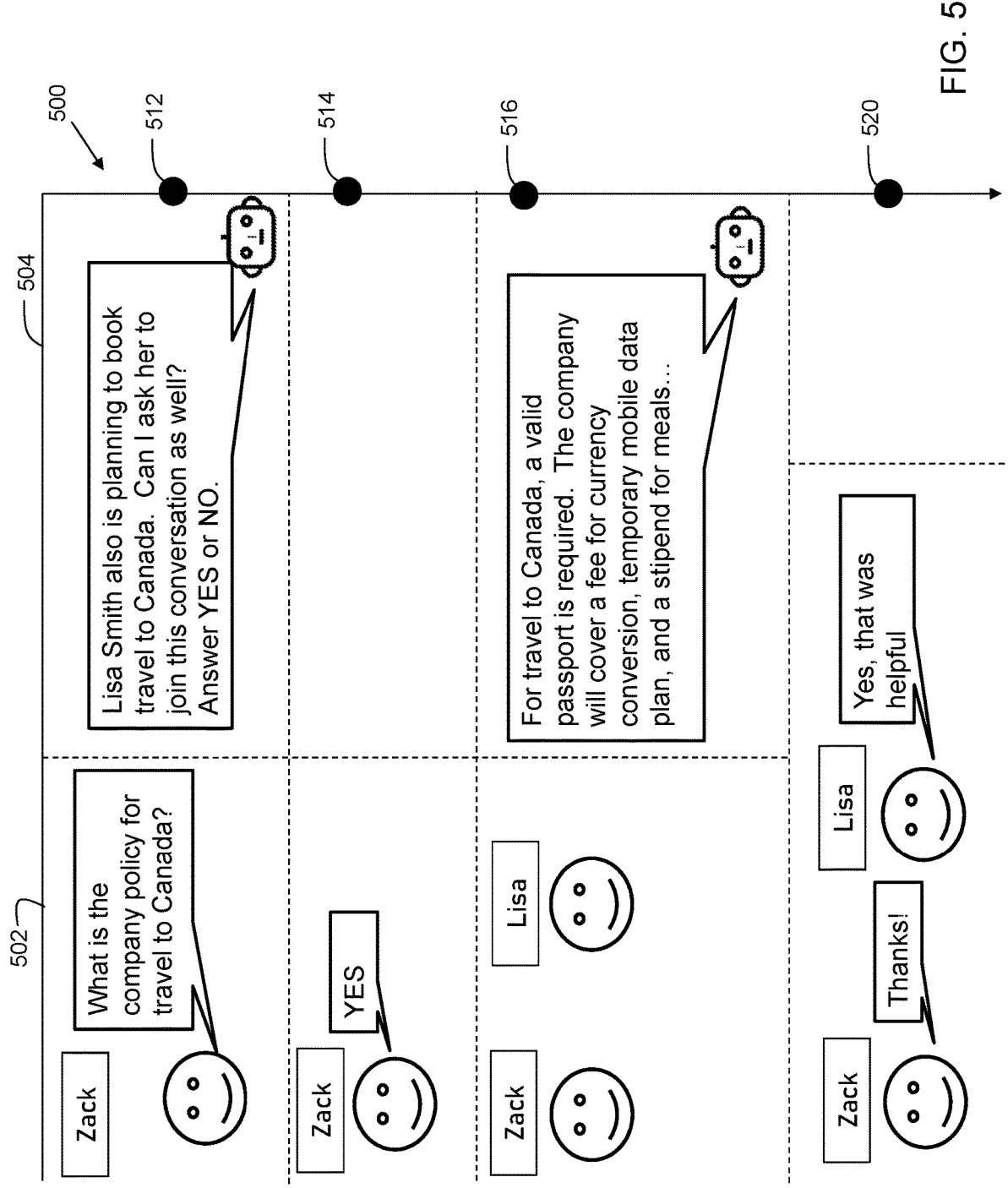
FIG. 5 is an example of a chatbot conversation inviting a user that would benefit from an answer to the submitted question.

FIG. 5 is an example 500 of a chatbot conversation inviting a user that it has been determined likely would benefit from an answer to the submitted question. This is an example of a chatbot inviting another human to listen in to the conversation relating to the question the initiator has. Here, a human user, Zack, has a question and initiates communication with the chatbot. The system 102 (FIG. 1), through analysis of previous communication of the users, determines that another human user, Lisa, may also benefit from the answer to the question. Embodiments (e.g., system 102 of FIG. 1), therefore, after confirming with the chat initiator, Zack, invites Lisa to the chat.

In FIG. 5, the chatbot is an automated response entity (such as 152 of FIG. 1) for interaction with a live user. User (human) communications are shown in column 502, and chatbot actions are shown in column 504. In column 502, row 512, Zack, says "What is the company policy for travel to Canada?" In column 504, row 512, the chatbot says, "Lisa Smith also is planning to book travel to Canada. Can I ask her to join this conversation as well? Answer YES or NO." In column 502, row 514, Zack responds, "YES." In column 502, row 514, Lisa is shown joined to the conversation. In column 504, row 516, the chatbot says, "For travel to Canada, a valid passport is required. The company will cover a fee for currency conversion, temporary mobile data plan, and a stipend for meals . . . ". In column 502, row 520, Zack responds, "Thanks!" and Lisa concurrently says, "That was helpful."

In some cases, in response to the initiator or the candidate invitee user declining the join, the system 102 (FIG. 1) may email the candidate invitee a transcript of the chatlog after the conversation concludes. Conclusion of the chat may be detected based on a predetermined period of inactivity (e.g., 10 minutes), or based on an exit keyword, such as "goodbye" or "bye." In this way, Lisa will still get the benefit of the information provided to Zack even though she was not joined to the conversation.

Figure 6A:
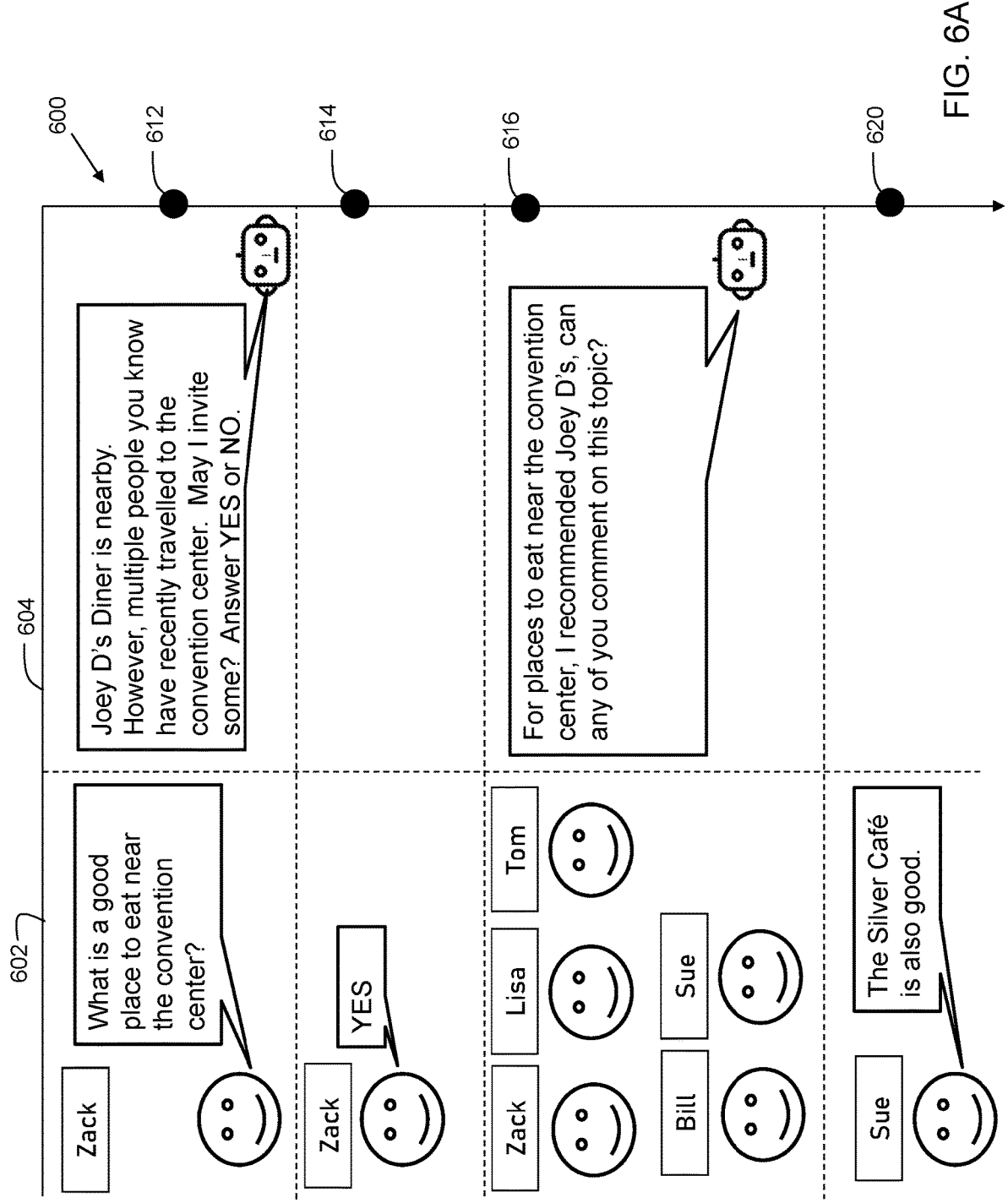
FIG. 6A is an example of a chatbot conversation inviting a group of users that may have information regarding the topic of the submitted question.

FIG. 6A is an example 600 of a chatbot conversation inviting a group of users that may have information regarding the topic of the submitted question. The NLP system (e.g., 162 of FIG. 1) may be able to discern "factual questions," such as 'what is the capital of New York?', from "subjective questions," such as 'what is a good place to eat near here?' In response to a determination that the submitted question is subjective in nature, embodiments (e.g., system 102 of FIG. 1) may join a plurality of additional users to the conversation, since a variety of answers can potentially lead to a consensus.

In the example, the chatbot is an automated response entity (such as 152 of FIG. 1) for interaction with a live user. User (human) communications are shown in column 602, and chatbot actions are shown in column 604. In column 602, row 612, human user, Zack, says "What is a good place to eat near the convention center?" For a subjective question like the one of this example, embodiments may set a group size of a particular plurality in order to get some consensus and/or a variety of opinions. An initial group size may be established (e.g., five live users). Over time, the system may adjust this based on machine learning and artificial intelligence techniques.

Embodiments can perform an evaluation to determine which users are candidates for inviting to the conversation. In some embodiments, weights are provided based on factors such as how long ago users last chatted, how many friends the user has in common with the initiator, and so on. In the example shown in the table below, the factors are whether the candidate has been to the convention center (analysis of social media check-ins), knows the initiator (analysis of social media connections and emails exchanged), and spoke with the initiator recently (analysis of social media private messages, email messages, etc.). Here, a point of 1 is assigned to a candidate if s/he has been to the location within the last three months, a point of 2 is assigned if it was in the last two months, and a 3 if it was in the last month. A point of 1 is assigned if s/he knows the initiator, and a 0 is assigned if s/he does not know the initiator. A point of 2 is assigned if s/he last spoke with the initiator 6 months ago or less, a point of 1 is assigned if it was more than six months ago. The four candidates with the highest scores become invitee users since, in this example, the group size is five (including the initiator).

|  | Anthony | Jennifer | John | Joyce | Lisa | Tom | Bill | Sue |
| --- | --- | --- | --- | --- | --- | --- | --- | --- |
| Been to the location: | 0 | 1 | 1 | 1 | 1 | 3 | 1 | 1 |
| Knows the initiator: | 0 | 0 | 1 | 1 | 1 | 1 | 1 | 1 |

|  | Anthony | Jennifer | John | Joyce | Lisa | Tom | Bill | Sue |
| --- | --- | --- | --- | --- | --- | --- | --- | --- |
| Spoke with the initiator recently | 0 | 0 | 0 | 0 | 2 | 1 | 1 | 2 |
| SCORES: | 0 | 1 | 2 | 2 | 4 | 5 | 3 | 4 |

Therefore, in this example. Lisa, Tom, Bill, and Sue become invitee users. Accordingly, in column 604, row 612, the chatbot says, "Joey D's Diner is nearby. However, multiple people you know have recently travelled to the convention center. May I invite some? Answer YES or NO." In column 602, row 614, Zack responds, "YES." In column 602, row 616, invitees Lisa, Tom, Bill, and Sue are shown joined to the conversation. In column 604, row 616, the chatbot says, "For places to eat near the convention center, I recommended Joey D's, can any of you comment on this topic?" In column 602, row 620, Sue responds, "The Silver Café is also good."

In some embodiments, the scores include rankings of the users based on expertise level relating to root topic. Information about expertise level may be scraped from previous communications (messages, social media posts, etc.), or be included in a user profile created by the user in the system (e.g., 102 of FIG. 1). For example, if a user is determined to be a subject matter expert on the relevant topic, a point value of 5 may be assigned. If the user is determined to know about the relevant topic, but not an expert (average level of knowledge), a point value of 3 may be assigned. If the user knows nothing about the topic, a point of 0 may be assigned. Expertise can be determined based on an inference from prior communications, education level, number of times the user has successfully resolved past questions, etc. In some embodiments, a subject matter expert may be deemed a candidate invitee automatically (or automatically invited to join a conversation) without reference to scores relating to other factors.

Figure 6B:
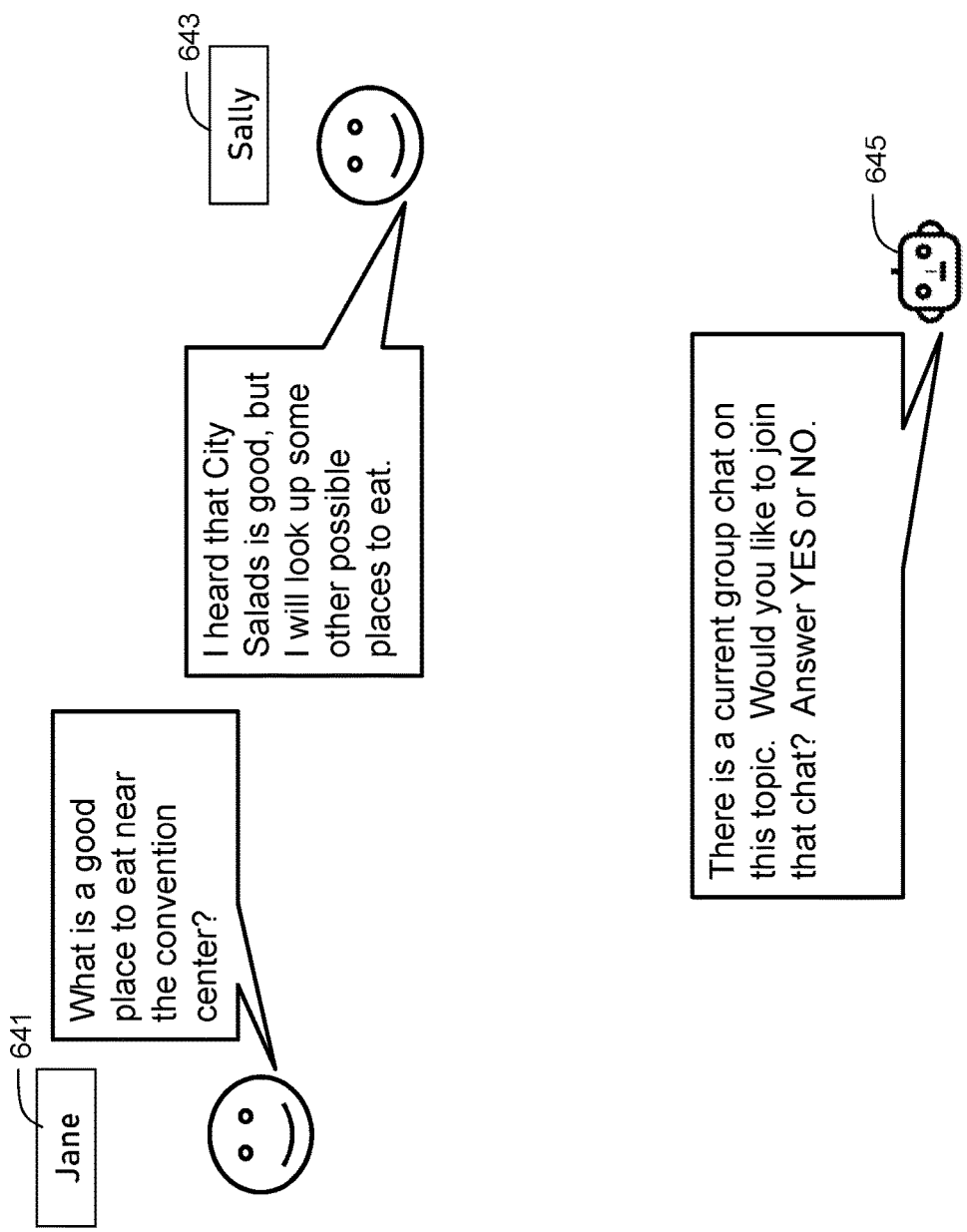
FIGS. 6B and 6C show an example of merging a conversation.
Figure 6C:
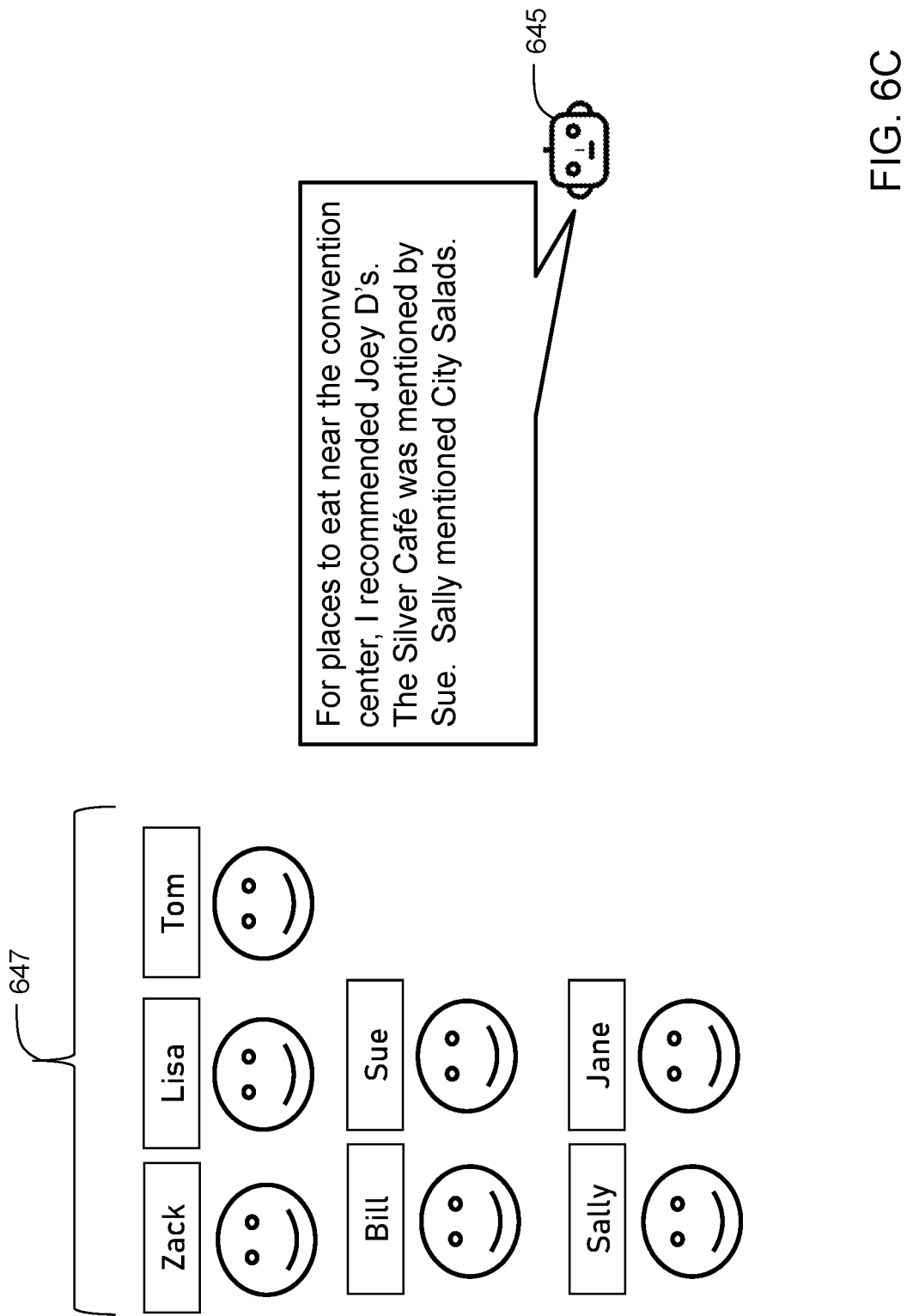

FIG. 6B and FIG. 6C illustrate another example that includes aggregation by merging of conversations. Referring to FIG. 6B, Jane 641 and Sally 643 are engaged in their own separate conversation on a messaging platform about where to eat near the convention center. Embodiments detect the similarity of topic/context, and the chatbot interjects into Jane and Sally's conversation asking whether they would approve of merging their conversation with the one among the initiator, Lisa, Tom, Bill, and Sue illustrated in FIG. 6A. If yes, the conversations are merged, and the initiator Lisa, Tom, Bill, Sue, Jane, and Sally are all added to the same chat conversation (chatlog). The chatlog of each of the separate conversations may be merged onto a screen so that all members of the current conversation can see the previous comments. In some embodiments, the chatbot may generate a summary of the previous comments into a new comment, as shown in FIG. 6C, where the chatbot 645 presents a computer-generated summary of previous comments indicating restaurants mentioned, and which participant from the group of participants 647 mentioned a particular restaurant. As shown in FIG. 6C, the chatbot 645 presents the message "For places to eat near the convention center, I recommended Joey D's. The Silver Café was mentioned by Sue. Sally mentioned City Salads" to the group of participants 647. Thus, some embodiments include identifying a topic of a first conversation between two users, correlating the topic of the conversation between the two users to a second conversation that is a concurrent chatbot conversation, and merging the first conversation with the second conversation.

In addition, embodiments can "learn," thereby becoming more effective over time. For example, the amount of ongoing messaging between the grouped-together users can be analyzed. The greater an amount the users converse after the chat, the better (e.g., higher) they will score to be grouped together in future chats. Other metadata can be used for machine learning or AI as well, and is not limited to the ongoing messaging.

Figure 7:
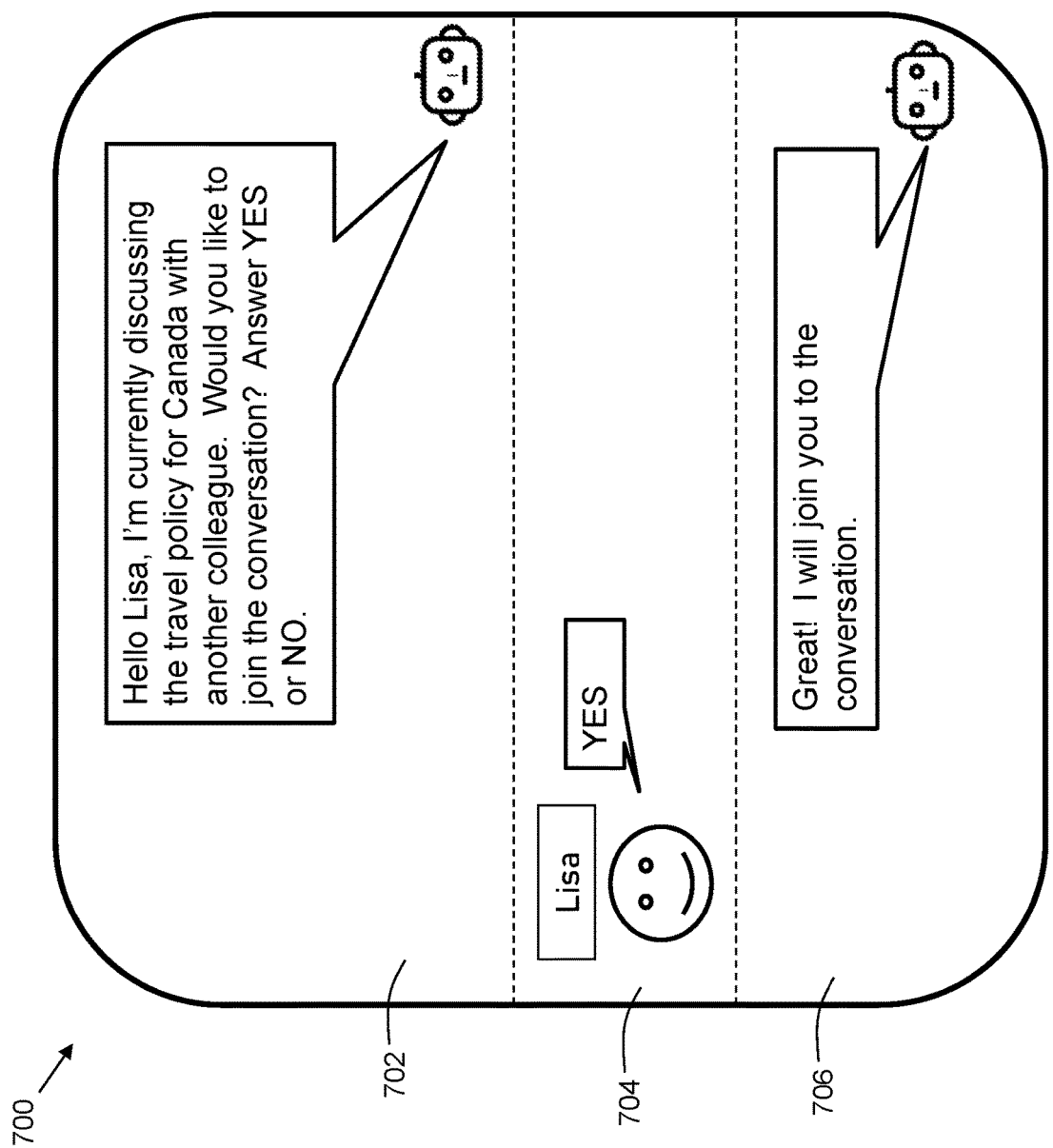
FIG. 7 is an example conversation join request for receiving information.

FIG. 7 is an example conversation join request for receiving information. Referring also to FIG. 5, this is a user interface 700 presented to (candidate) Lisa, inviting her to join the conversation with Zack (the initiator). At 702, there is shown the invitation language from the chatbot, "Hello Lisa, I'm currently discussing the travel policy for Canada with another colleague. Would you like to join the conversation? Answer YES or NO." At 704, Lisa responds by typing YES. Note that in some embodiments, instead of typing, the response may be entered via a selectable button, chosen from a drop-down menu, or any other suitable mechanism now known or hereafter developed. At 706, the chatbot responds, "Great! I will join you to the conversation." Note, in some embodiments, this join request step may be omitted, and additional candidate users, such as Lisa, may be automatically joined to the conversation.

Figure 8:
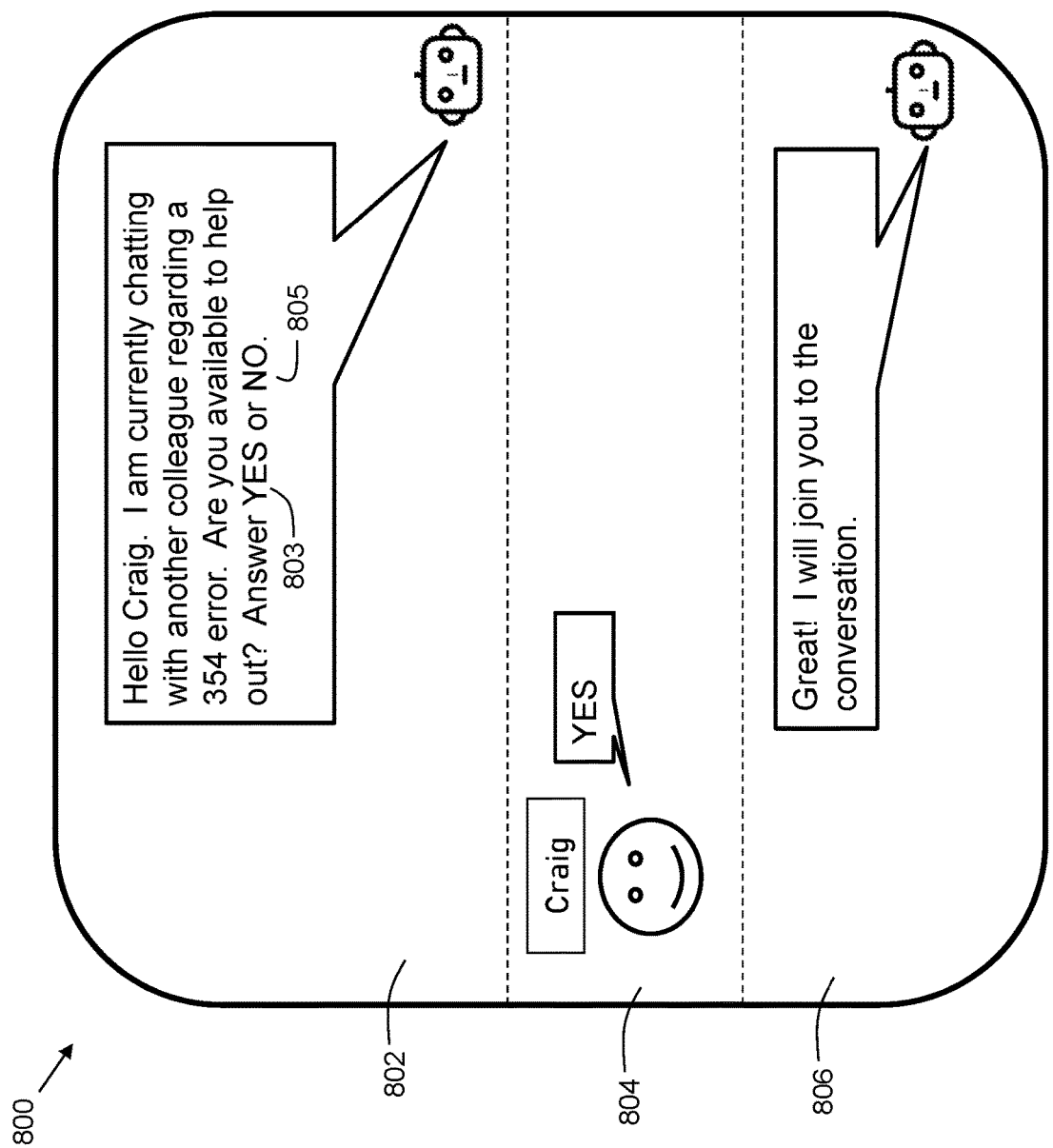
FIG. 8 is an example conversation join request for providing information.

FIG. 8 is an example conversation join request for providing information. Referring also to FIG. 4, this is a user interface 800 presented to (candidate) Craig, inviting him to the conversation with Zack (the initiator). At 802, there is shown the invitation language from the chatbot, "Hello Craig. I am currently chatting with another colleague regarding a 354 error. Are you available to help out? Answer YES or NO." At 804, Craig responds by clicking YES as it is a selectable button at 803, and NO is a selectable button at 805. Note that in some embodiments, instead of a button, the response may be typed into a field, chosen from a drop-down menu, or any other suitable mechanism now known or hereafter developed. At 806, the chatbot responds, "Great! I will join you to the conversation." Note, in some embodiments, this join request step may be omitted, and additional candidate users, such as Craig, may be automatically joined to the conversation.

Figure 9:
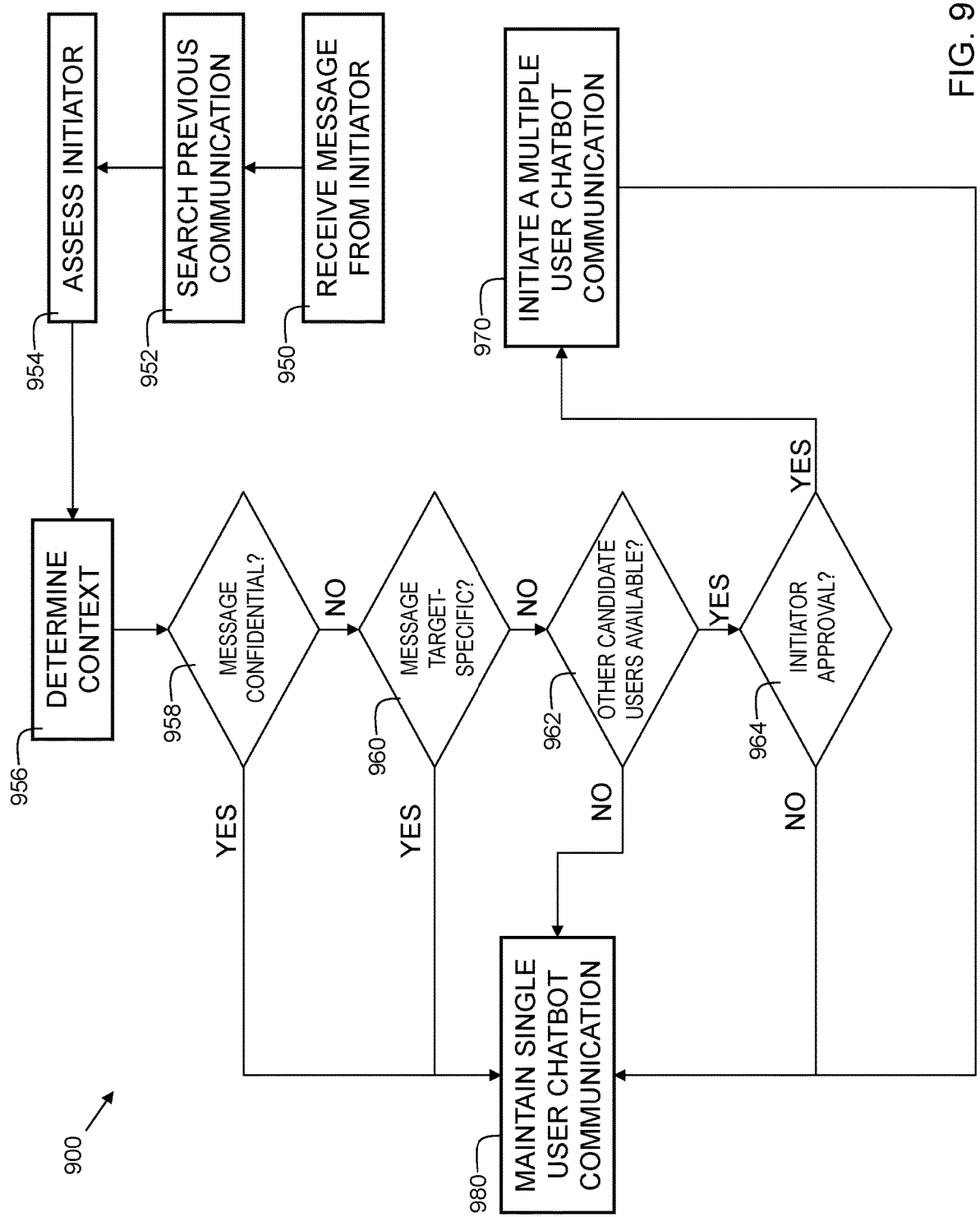
FIG. 9 is a flowchart indicating additional process steps for embodiments of the present invention.

FIG. 9 is a flowchart 900 indicating additional process steps for embodiments of the present invention. At 950, a message is received from an initiator, a live user who starts a chat with the chatbot. At 952, previous communications involving the user are scraped, searched, and analyzed, if available. Such communications can include text messages to or from the user, emails to or from the user, social media posts of the user, etc.

At 954, the initiator is assessed. Information about the initiator is determined from analysis of the current and/or previous communications (from 952). Example information that may be inferred are the user's age range, gender, skills, education level, occupation, and job responsibilities. For example, if the user works in accounting, she may know, or be interested in discussions, about a new tax policy and how it affects business.

At 956, context of the question from the initiator is determined. This may be performed using natural language processing and/or entity detection to infer what the root (main) topic of the conversation is about.

At 958, it is determined whether the topic is confidential (i.e., private). Embodiments can include performing a private subject matter determination on the identified topic. A private subject matter determination is a computer-implemented natural language processing procedure to determine if the subject matter of a question to a chatbot is likely of a confidential/private topic. Keywords in the initiator's message may be detected for topics that are likely the initiator would prefer to not bring in other people, such as salary, healthcare, secret projects, etc. Keywords in such message may be detected for topics that are likely the initiator would be comfortable bringing in other people, such as group projects, team meetings, or restaurant recommendations, etc. The keywords can be matched against a database of known words-confidentiality level pairings, or may be based on a score calculation.

If, at 958, the determination is that the topic is confidential (i.e., positive result of private subject matter determination), the process proceeds to 980 where a single user chatbot communication is maintained. If, at 958, the determination is that the topic is not confidential (i.e., negative result of private subject matter determination), then at 960, it is determined whether the message is target-specific. In some embodiments, a list of predetermined topics may be designated as confidential (e.g., salary, healthcare, etc.). If the question is determined to be one of the confidential topics, then the private subject matter determination is positive.

If, at 960, the determination is that the message is target-specific (the topic of the questions pertains only to the initiator), the process proceeds to 980 where a single user chatbot communication is maintained. If the message is targeted about a specific individual, then a multiuser chat should not be offered.

If, at 960, the determination is that the topic is not target-specific, then at 962, it is determined whether other candidate users are available. The analysis checks whether there is anyone in the user base that is likely to know the answer to the initiator's question.

If, at 962, the determination is that other candidate users are not available, the process proceeds to 980 where a single user chatbot communication is maintained. If at 962, the determination is that other candidate users are available, then at 964, it is determined whether the initiator approves of the joining of such one or more candidate users. The chatbot sends a message to the user to ask whether s/he accepts for other users to join the conversation.

If, at 964, the determination is that the user approves, then at 970, a multiuser (aggregated) conversation is initiated by the chatbot by joining at least one invitee user (which was predetermined as a candidate user) to the conversation. If, at 964, the determination is that the user does not approve, the process proceeds to 980 where a single user chatbot communication is maintained.

In some embodiments, determining a probability that one or more additional users would benefit from an answer to the submitted question is based on historical use of the messaging platform. In some embodiments, determining a probability that one or more additional users have information regarding the topic of the submitted question is based on historical use of the messaging platform. In some embodiments, other factors are taken into account, in addition, or instead of historical use of the messaging platform.

Figure 10:
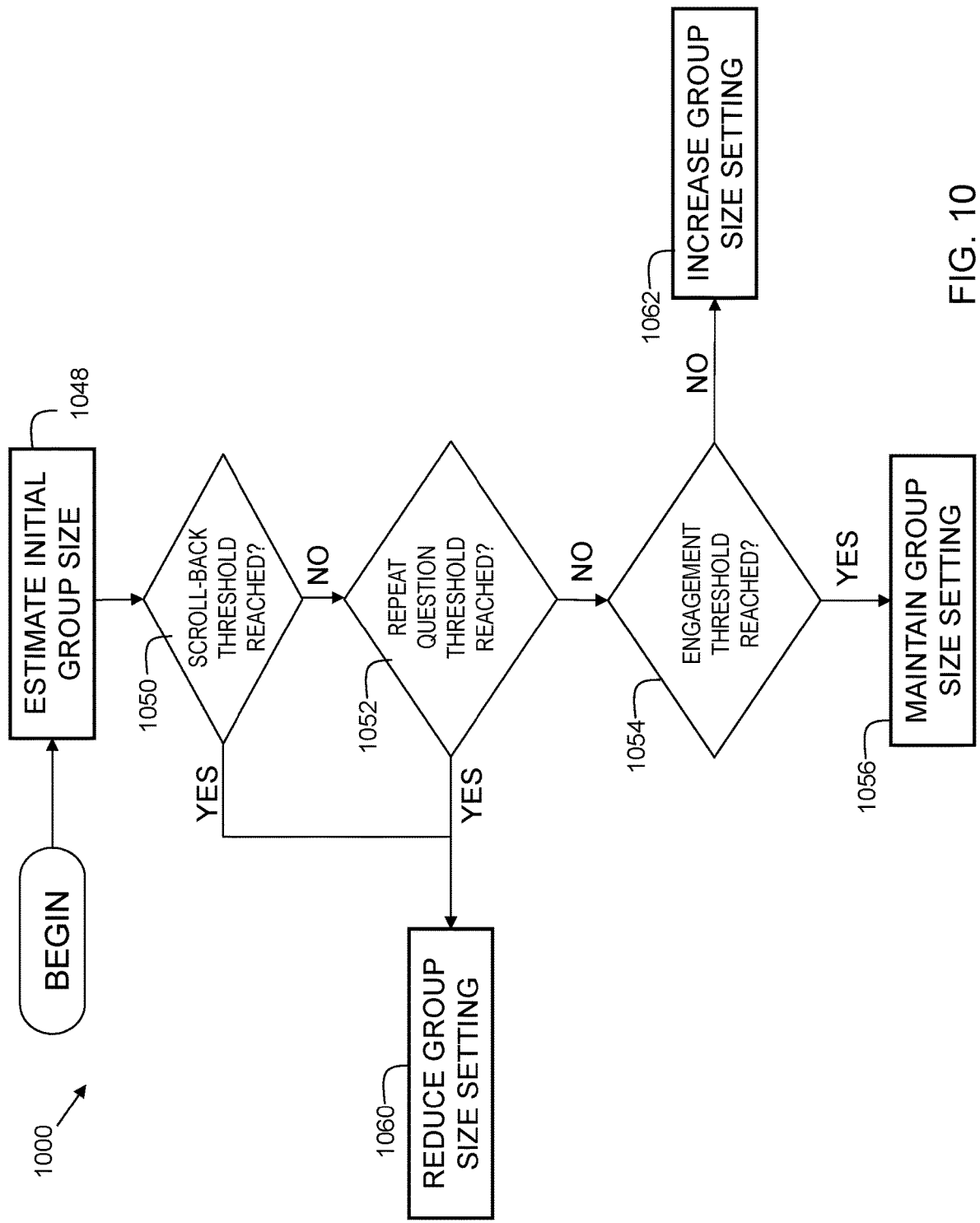
FIG. 10 is a flowchart indicating process steps for determining optimal group size.

FIG. 10 is a flowchart 1000 indicating process steps for determining optimal group size. In some embodiments, at 1048, an initial optimal group size is estimated. In some embodiments, this may be based on historical use of the messaging platform. This can include factors such as how often a user engages in chat conversations that contain two or more people, which can serve as an indication of the user's communication style preference. This can also be based on keywords in the initiator's question, or the analysis of social media, etc. described also with respect to FIG. 9. A historical analysis may be performed to determine what is the average amount of people (initiator+invitees) involved in an average conversation about this subject matter. In some embodiments, this is retrieved via querying previous messaging chat logs for a normal fit within a standard deviation after crowdsourcing and running natural language processing (NLP) on all subject matter with matching keywords in the message.

At 1050, it is determined whether a scroll-back threshold was reached. In some embodiments, determining an optimal group size comprises performing a scroll back analysis for each of the one or more current users. This analyzes whether users are having to scroll back on the chat log too far or too often to see previous conversation history, which, if true, indicates that a smaller group would be optimal since the message board gets crowded. In some embodiments, this step is performed by processing the metadata of user interaction with the messaging platform application to determine speed of scrolling, number of times of the scrolling, etc. If the speed or number of times is greater than a predetermined threshold, a smaller group size is indicated. If the speed or number of times is lower than a predetermined threshold, maintaining current group size is indicated, or in some cases, a larger group size is indicated.

If, at 1050, the determination is yes, then at 1060, group size setting is reduced. If, at 1050, the determination is no, then at 1052, it is determined whether a repeat question (i.e., re-asking of questions by one or more users) threshold has been reached. In some embodiments, determining an optimal group size comprises performing a repeat question analysis for each of the one or more current users. If current users are asking the same question multiple times (for example, more than three), this indicates that the user is likely not understanding the answers. If, at 1052, the determination is yes, then at 1060, group size setting is reduced.

If, at 1052, the determination is no, then at 1054, it is determined whether an engagement threshold is reached. This analyzes whether there is enough participation and whether questions are getting answered. Semantic processing of user's responses "Ok, I guess that helps" (which is negative) versus "Ah, I see now" (which is positive). Detecting negative phrases like "I don't know," "not sure," and so on, can indicate that questions are not getting resolved, which can move the process flow to step 1062. Detecting positive phrases like "great," "thank you," or "wow," can move the algorithm towards step 1056.

If, at 1054, the determination is no, then at 1062, a group setting is increased. If, at 1054, the determination is yes, then at 1056, the group setting is maintained.

The process flow of FIG. 10 is exemplary, and not meant to be limiting. Additional or alternative factors may be considered in determining optimal group size. Moreover, the order of the steps may be modified, with some steps omitted or others added within the scope of embodiments of the invention.

An example formula for computing a group size G to determine a number of recommended users for this conversation is described below:

Scroll Speed: A large backwards scroll implies too many users present. In embodiments, the scroll may be measured in rows of text per second, or other suitable units. The scroll speed is determined as part of a scroll back analysis process.

Semantic score—Confidence score of resolution phrase detected via NLP, ranging from 0-1.

X=Invitee count average—Average number of users associated with the topic or category of the current conversation (e.g., travel questions, computer troubleshooting, etc.).

Y=Re-detection of chat—Count of how many times a user re-asks or restates the question. The value Y is determined as part of a repeat question analysis process.

Z=Node Traversal—In a non-multiuser chat, how many users must be asked the same (or similar) question before successful resolution.

The group size G can then be expressed as:

$$G = \frac{ScrollSpeed}{Semantic\ Score} \times \left(\frac{X+Y+Z}{3}\right)$$

Note that this formula is an example, and not meant to be limiting. Over time, the flow/formula can be refined by machine learning or AI (artificial intelligence) based on historical data. For example, an analysis can be performed of the number of people that the user had to talk to and revise the query until they get to a user with the answer. Based on this analysis, an initial group size may be optimized in future chats.

Figure 11:
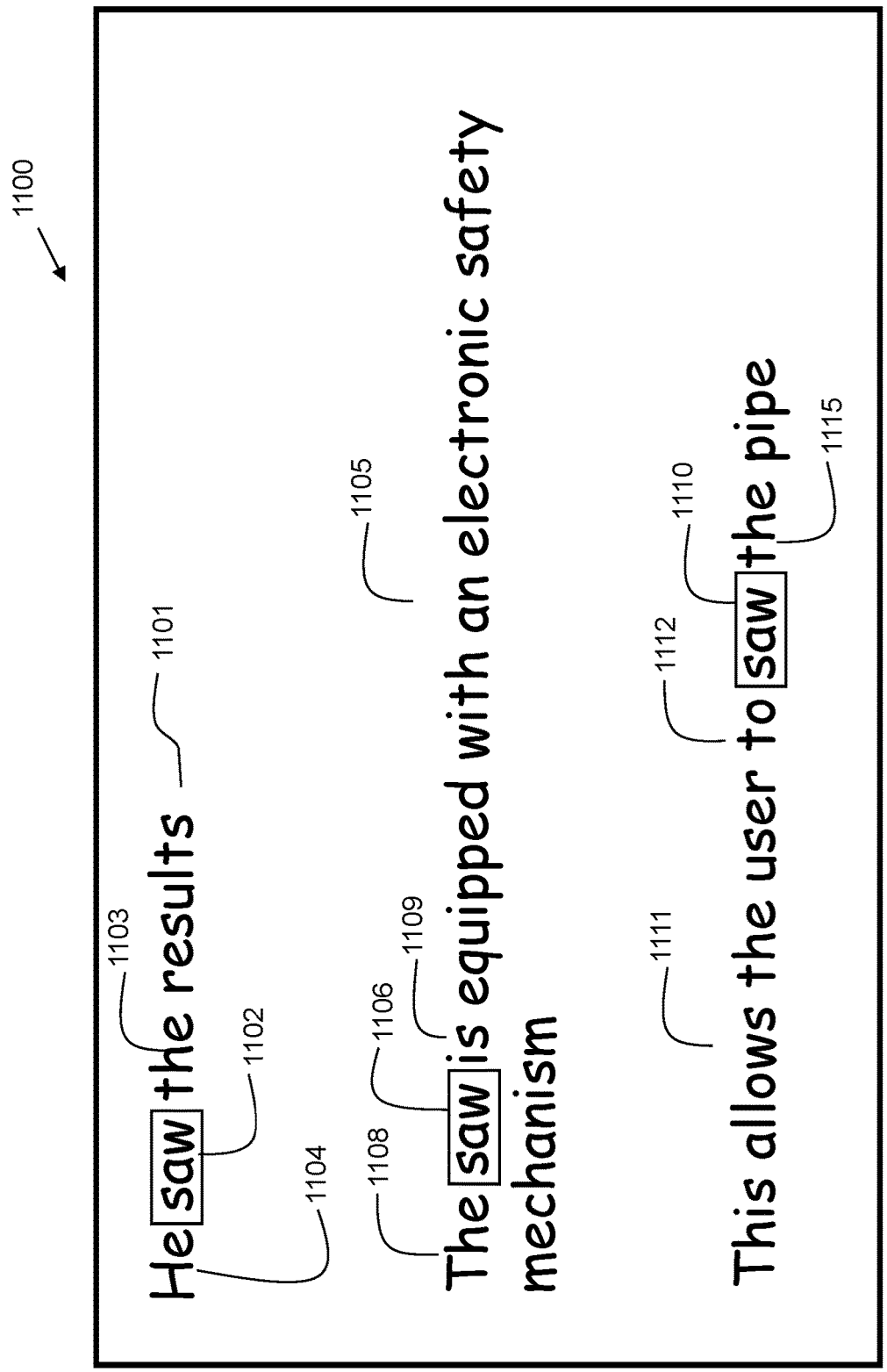
FIG. 11 shows an example of disambiguation in accordance with embodiments of the present invention.

FIG. 11 shows an example 1100 of disambiguation in accordance with embodiments of the present invention. Disambiguation is one of the processes that may be utilized for natural language processing by natural language processing system 162 (FIG. 1) of embodiments of the present invention. Chatlog, message log, speech-to-text transcript, provided text, or scraped content is tokenized into words and tagged with parts of speech. For some words, there can be more than one meaning and/or part of speech. FIG. 11 shows a disambiguation example with the word "saw." In phrase 1101, the word "saw" 1102 is a past tense verb. In embodiments, a machine learning natural language analysis module may identify the prior token 1104 to the word "saw" as a pronoun, and the following token 1103 as an article. In training a classifier, the pattern of pronoun-token-article may be associated with a verb, and thus the token is interpreted as a verb.

In phrase 1105, the word "saw" 1106 is a noun for a cutting tool. In embodiments, a machine learning natural language analysis module may identify the prior token 1108 to the word saw as an article, and the following token 1109 as a verb. In training a classifier, the pattern article-token-verb may be associated with a noun, and thus the token is interpreted as a noun.

In phrase 1111, the word "saw" 1110 is a verb for cutting. In embodiments, a machine learning natural language analysis module may identify the prior token 1112 to the word "saw" as part of an infinitive form, and the following token 1115 as an article. In training a classifier, the pattern "to"-token-article may be associated with a verb, and thus the token is interpreted as a verb. These classifiers and techniques for disambiguation are examples, and other classifiers and techniques are possible.

Figure 12:
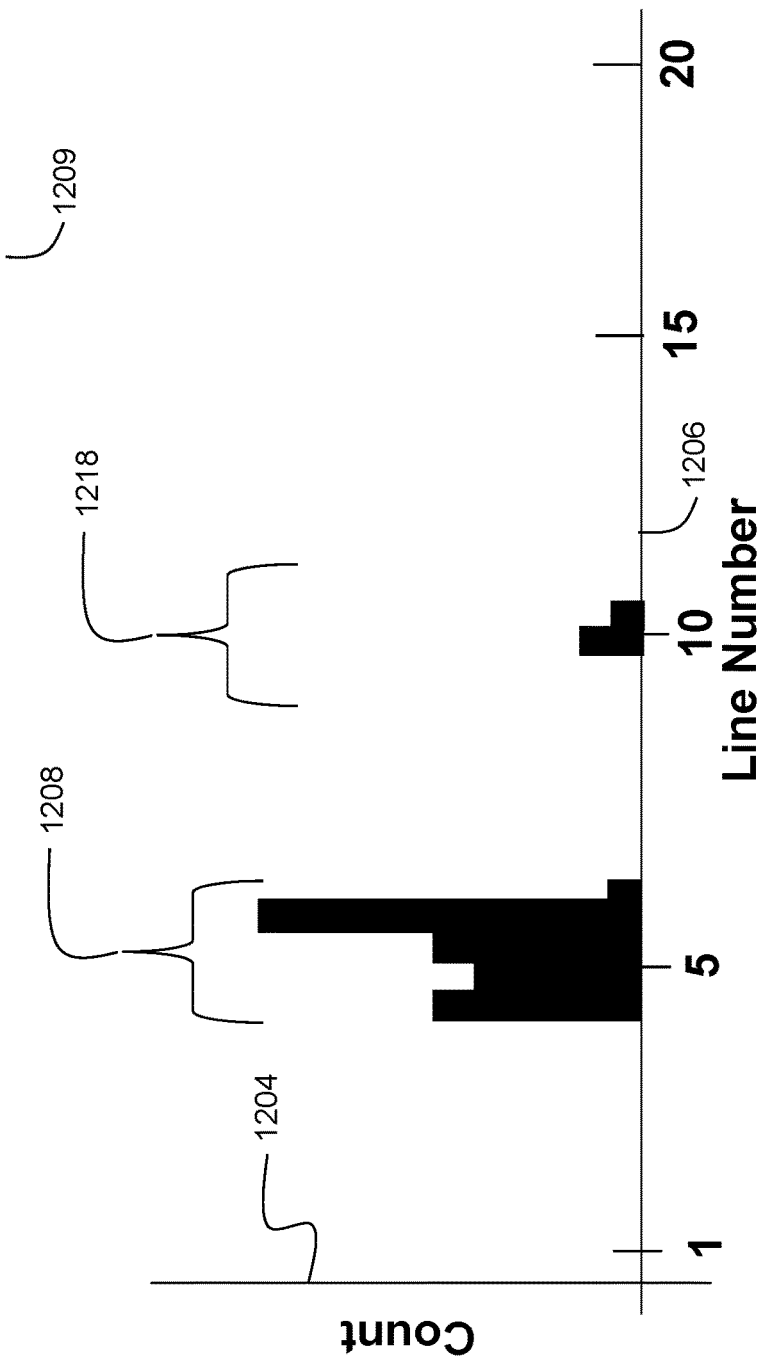
FIG. 12 shows an example of a dispersion analysis in accordance with embodiments of the present invention.

FIG. 12 shows an example 1200 of a dispersion analysis in accordance with embodiments of the present invention. Dispersion analysis is one of the processes that may be utilized for natural language processing by natural language processing system 162 (FIG. 1) of embodiments of the present invention. In a chat log, message log, speech-to-text transcript, scraped data, or another item, a particular word may have a non-uniform distribution during the conversation during the messaging session. In the example 1200, a dispersion analysis is performed for the word "error" 1209 in an email message. A graph comprises a horizontal axis 1206 representing line numbers of a message, and a vertical axis 1204 representing a number of occurrences of word 1209 in the message log at a given line number. As can be seen in the graph, the presence of the word 1209 is concentrated in certain lines of a text message. A maximum concentration 1208 is identified in the area around line number 5, and in a smaller concentration 1218 occurs around line number 10. Alternatively, another measure may be used instead of, or in addition to, line number, such as paragraph number and/or word position.

Figure 13:
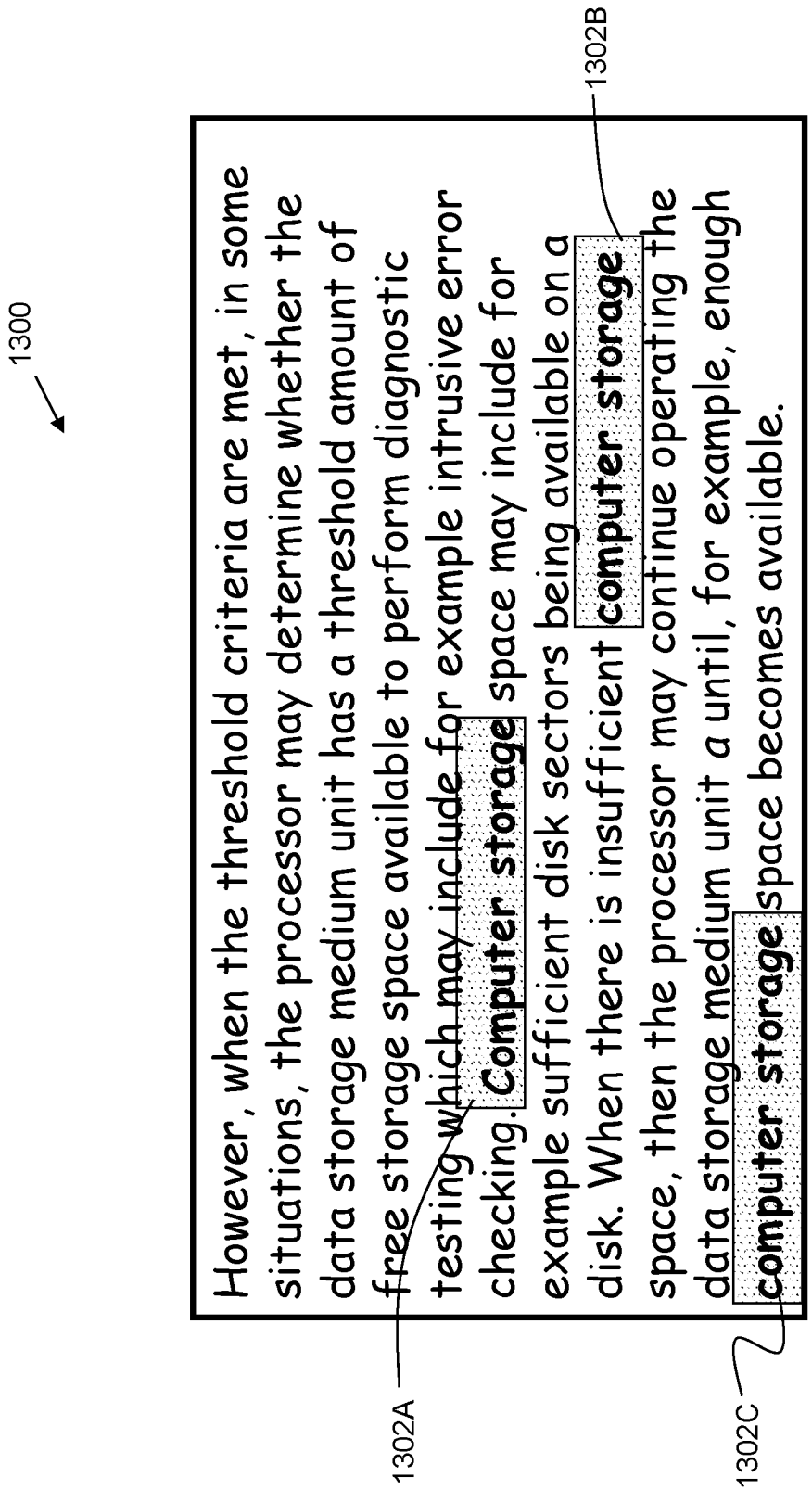
FIG. 13 shows an example of a bigram analysis in accordance with embodiments of the present invention.

FIG. 13 shows an example 1300 of a bigram analysis in accordance with embodiments of the present invention. In a bigram analysis, a pair of words in a particular order may be searched within a chat log, message log, speech-to-text transcript, scraped data, or another item. In this example, the bigram "computer storage" is searched within a text excerpt. Three occurrences, indicated as 1302A, 1302B, and 1302C are present in the text passage. In embodiments, the usage of bigrams, trigrams, or more generally, n-grams (number=n), may be used to improve relevance in analyzing a chat log, message log, speech-to-text transcript, scraped data, or another item. The aforementioned disambiguation, dispersion analysis, and/or bigram analysis can be used in NLP techniques and/or entity detection in accordance with embodiments of the present invention.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

As can now be appreciated, disclosed embodiments provide improvements in the technical field of chatbot operations. Improved information dissemination can be achieved by expanding user-chatbot conversations to include other relevant parties. Decisions on which users to include (aggregate) can be based on previous communication and/or a priori known information such as that of a user profile. Subject matter experts can be automatically engaged to resolve user questions. Furthermore, users that could benefit from the information that the question initiator has asked can be automatically joined to a user-chatbot conversation. In this way, an improved user experience is achieved when engaging with a chatbot.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for context-sensitive chatbot aggregation in a messaging platform comprising:
   receiving a submitted question to a chatbot in a conversation on the messaging platform;
   identifying a topic of the submitted question;
   determining a probability that one or more additional users would benefit from an answer to the submitted question;
   performing a private subject matter determination on the identified topic; and
   inviting, only if the private subject matter determination is negative, one or more additional users to the conversation based on the determined probability that one or more additional users would benefit from an answer to the submitted question.

2. The computer-implemented method of claim 1, further comprising:
   determining a probability that one or more additional users have information regarding the topic of the submitted question; and
   inviting, only if the private subject matter determination is negative, one or more additional users to the conversation based on the determined probability that one or more additional users have information regarding the topic of the submitted question.

3. The computer-implemented method of claim 2, wherein determining a probability that one or more additional users have information regarding the topic of the submitted question is based on historical use of the messaging platform.

4. The computer-implemented method of claim 1, further comprising:
   determining an optimal group size for the conversation;
   determining a current group size for a current group of the conversation, wherein the current group comprises one or more current users; and
   inviting, only if the private subject matter determination is negative, one or more additional users to the conversation based on the determined optimal group size for the conversation and the determined current group size for the conversation.

5. The computer-implemented method of claim 4, wherein determining an optimal group size comprises performing a scroll back analysis for each of the one or more current users.

6. The computer-implemented method of claim 4, wherein determining an optimal group size comprises performing a repeat question analysis for each of the one or more current users.

7. The computer-implemented method of claim 4, wherein determining an optimal group size for the conversation is based on historical use of the messaging platform.

8. The computer-implemented method of claim 1, wherein determining a probability that one or more additional users would benefit from an answer to the submitted question is based on historical use of the messaging platform.

9. An electronic computation device comprising:
   a processor;
   a memory coupled to the processor, the memory containing instructions, that when executed by the processor, perform the process of:
   receiving a submitted question to a chatbot in a conversation on a messaging platform;
   identifying a topic of the submitted question;
   determining a probability that one or more additional users would benefit from an answer to the submitted question;
   performing a private subject matter determination on the identified topic; and
   inviting, only if the private subject matter determination is negative, one or more additional users to the conversation based on the determined probability that one or more additional users would benefit from an answer to the submitted question.

10. The electronic computation device of claim 9, wherein the memory further comprises instructions, that when executed by the processor, perform the process of:
    determining a probability that one or more additional users have information regarding the topic of the submitted question; and
    inviting, only if the private subject matter determination is negative, one or more additional users to the conversation based on the determined probability that one or more additional users have information regarding the topic of the submitted question.

11. The electronic computation device of claim 9, wherein the memory further comprises instructions, that when executed by the processor, perform the process of:
    determining an optimal group size for the conversation;
    determining a current group size for a current group of the conversation, wherein the current group comprises one or more current users; and
    inviting, only if the private subject matter determination is negative, one or more additional users to the conversation based on the determined optimal group size for the conversation and the determined current group size for the conversation.

12. The electronic computation device of claim 11, wherein the memory further comprises instructions, that when executed by the processor, perform the process of performing a scroll back analysis for each of the one or more current users as part of the determination of optimal group size.

13. A computer program product for an electronic computation device comprising a computer readable storage medium having program instructions embodied therewith, the program instructions executable by a processor to cause the electronic computation device to perform the process of:
    receiving a submitted question to a chatbot in a conversation on a messaging platform;
    identifying a topic of the submitted question;
    determining a probability that one or more additional users would benefit from an answer to the submitted question;
    performing a private subject matter determination on the identified topic; and
    inviting, only if the private subject matter determination is negative, one or more additional users to the conversation based on the determined probability that one or more additional users would benefit from an answer to the submitted question.

14. The computer program product of claim 13, wherein the computer readable storage medium includes program instructions executable by the processor to cause the electronic computation device to perform the process of:

determining a probability that one or more additional users have information regarding the topic of the submitted question; and inviting, only if the private subject matter determination is negative, one or more additional users to the conversation based on the determined probability that one or more additional users have information regarding the topic of the submitted question.

15. The computer program product of claim 13, wherein the computer readable storage medium includes program instructions executable by the processor to cause the electronic computation device to perform the process of:

determining an optimal group size for the conversation;

determining a current group size for a current group of the conversation, wherein the current group comprises one or more current users; and inviting, only if the private subject matter determination is negative one or more additional users to the conversation based on the determined optimal group size for the conversation and the determined current group size for the conversation.

16. The computer program product of claim 15, wherein the computer readable storage medium includes program instructions executable by the processor to cause the electronic computation device to perform the process of determining an optimal group size based on performing a scroll back analysis for each of the one or more current users.

17. The computer program product of claim 16, wherein the computer readable storage medium includes program instructions executable by the processor to cause the electronic computation device to perform the process of determining an optimal group size based on performing a repeat question analysis for each of the one or more current users.

* * * * *